(No Model.)
G. EISENNENGER.
BABY CARRIAGE.
No. 596,697.
Patented Jan. 4, 1898.
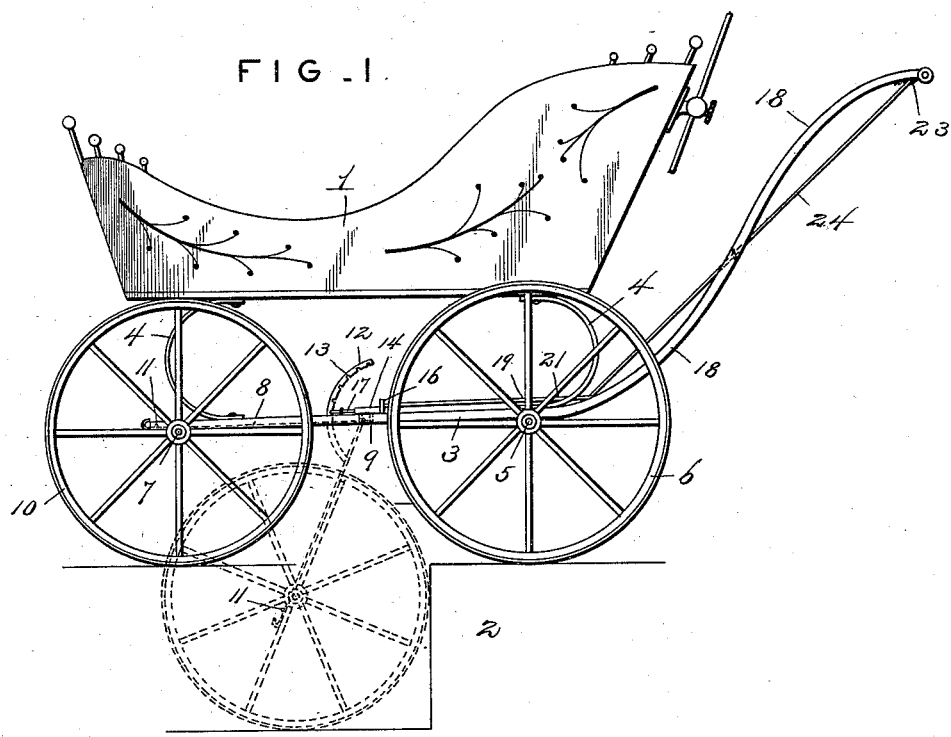
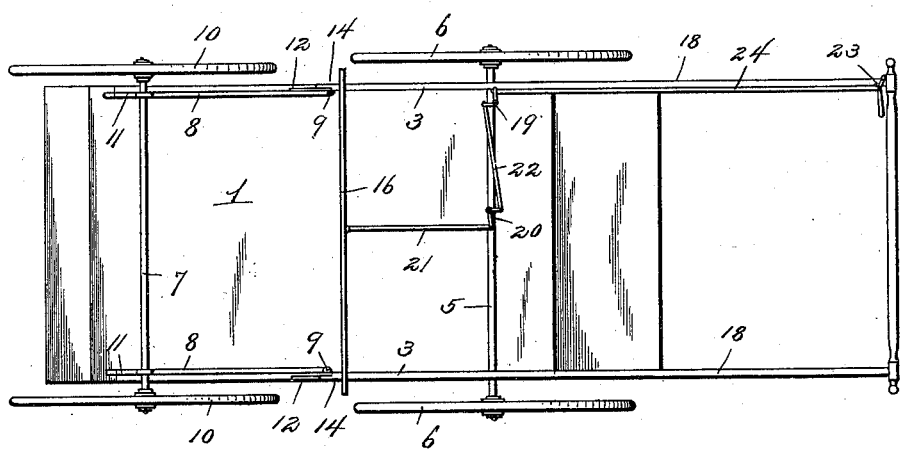
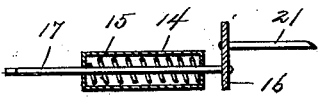
WITNESSES
INVENTOR
George Eisennenger,
By John Hedderburn
Attorney

UNITED STATES PATENT OFFICE.

GEORGE EISENNENGER, OF UTICA, NEW YORK, ASSIGNOR OF ONE-HALF TO AUGUST HENSEL, OF SAME PLACE.

BABY-CARRIAGE.

SPECIFICATION forming part of Letters Patent No. 596,697, dated January 4, 1898.

Application filed March 25, 1897. Serial No. 629,114. (No model.)

*To all whom it may concern:*

Be it known that I, GEORGE EISENNENGER, of Utica, in the county of Oneida and State of New York, have invented certain new and useful Improvements in Baby-Carriages; and I do hereby declare the following to be a full, clear, and exact description of the invention, such as will enable others skilled in the art to which it appertains to make and use the same.

This invention relates to baby-carriages.

The difficulty experienced in wheeling a baby-carriage down a flight of stairs is well known, and it is also obvious that there is great objection to having the carriage-body inclined when the child is seated therein.

My object is to obviate the foregoing difficulties, and this is accomplished by the provision of a baby-carriage having a truck of novel construction, as will appear more fully hereinafter, and the novel features of the invention will be recited in the appended claims.

In the accompanying drawings, Figure 1 is a side elevation, dotted lines showing the position of the forward wheels when the carriage is descending a flight of stairs; Fig. 2, a bottom view, and Fig. 3 a detail of the locking mechanism.

The numeral 1 designates the body of a baby-carriage, and 2 a flight of stairs. The truck is shown at 3, and the cushioning-springs are shown at 4, the same being connected to the side rails of the truck. The axle of the rear wheels is shown at 5, and 6 are the wheels journaled thereto. This axle is secured to the side rails, as usual. The axle 7 of the forward wheels is not fixed in relation to the truck, as is the case with the rear axle. There are two side bars or rods 8, which are hinged to the said rails at the points 9, and these rods are adapted to swing downwardly. The front axle 7 is connected to these rods, and the front wheels 10 are journaled on the ends of said axle. It will thus be observed that when the rods swing downwardly the forward wheels are carried by them. These rods 8 are provided with lugs 11, adapted to fit in the forward portions of the said rails of the truck, so as to prevent relative movement of the rods and said side rails when the former are in horizontal position, as ordinarily. The rods 8 carry segments 12, having notches or pockets 13. There are casings 14 secured to the side rails of the truck, and in the same are located coil-springs 15.

The numeral 16 designates a cross-bar which slides on the side rails and is connected to the springs, so that it is normally turned forward. Locking-rods 17 are secured to this bar near its ends and work through the casings and against the segments 12, said rods being adapted for reception in the notches 13, whereby the rods 8 can be locked against the said rails of the truck or locked at an angle in relation to the latter. The handle of the carriage is shown at 18. There are two bell-crank levers 19 and 20 pivoted to the rear axle. One arm of the bell-crank lever 20 is connected to the cross-bars 16 by a rod 21, and its other arm is connected to one arm of the lever 19 by a rod 22. There is a pivoted spring-pressed locking-lever 23 adjacent the cross-bar of the handle, and a rod 24 connects this lever with the other arm of the bell-crank lever 19.

It will be observed that with the foregoing construction the lever 23 can be retracted at any time, thereby releasing the locking-rods from the segments and allowing the front wheels of the baby-carriage to drop and be locked in inclined relation to the rear wheels and the carriage-body, as shown in the drawings, so that the body of the carriage and the handle may be kept in a horizontal position while the carriage is going down a flight of steps. When the front wheels are in this position, owing to the fact that they are disposed partly beneath the rear wheels there is exerted a sort of braking action, so that the descent of the carriage down the steps is checked. When level is again reached, the lever can be grasped, whereupon the front wheels will swing up into horizontal position and can be locked.

There are many slight changes which could be resorted to in carrying out the present invention without detracting from any of the advantages thereof, and hence I do not limit myself to the precise construction described, but consider that I am entitled to all such changes as properly come within the spirit and scope of the invention.

Having thus described the invention, what is claimed as new, and desired to be secured by Letters Patent, is—

1. In a wheeled vehicle, the combination with a truck, of bars hinged thereto and adapted to swing downwardly, wheels journaled to the bars, and mechanism for locking the bars in alinement with the truck or at an angle thereto.

2. In a wheeled vehicle, the combination with a truck, of a set of wheels journaled thereto, rods hinged to the truck in advance of the said wheels and adapted to swing downwardly, additional wheels journaled to the free portions of the rods, and means for locking the rods in alinement with the truck or at an angle thereto.

3. In a wheeled vehicle, the combination with a truck, of rods hinged thereto and adapted to swing downwardly, segments carried by the rods, spring-actuated locking devices adapted to engage with the segments, releasing mechanism for said spring-actuated devices, and wheels journaled to the free portions of the rods.

4. In a wheeled vehicle, the combination with a truck, of bars hinged thereto and adapted to swing downwardly, wheels journaled to the bars, locking-segments secured to the bars, a cross-bar slidable on the truck, casings connected to the truck, springs located in the casing and actuating the cross-bar, locking-rods connected to the cross-bar and adapted to engage with the segments, and means for moving the cross-bar against the action of the spring.

In testimony whereof I have signed this specification in the presence of two subscribing witnesses.

GEO. EISENNENGER.

Witnesses:
HERRMANN ZIMMERMANN,
FRED BOCKMAN.